UNITED STATES PATENT OFFICE.

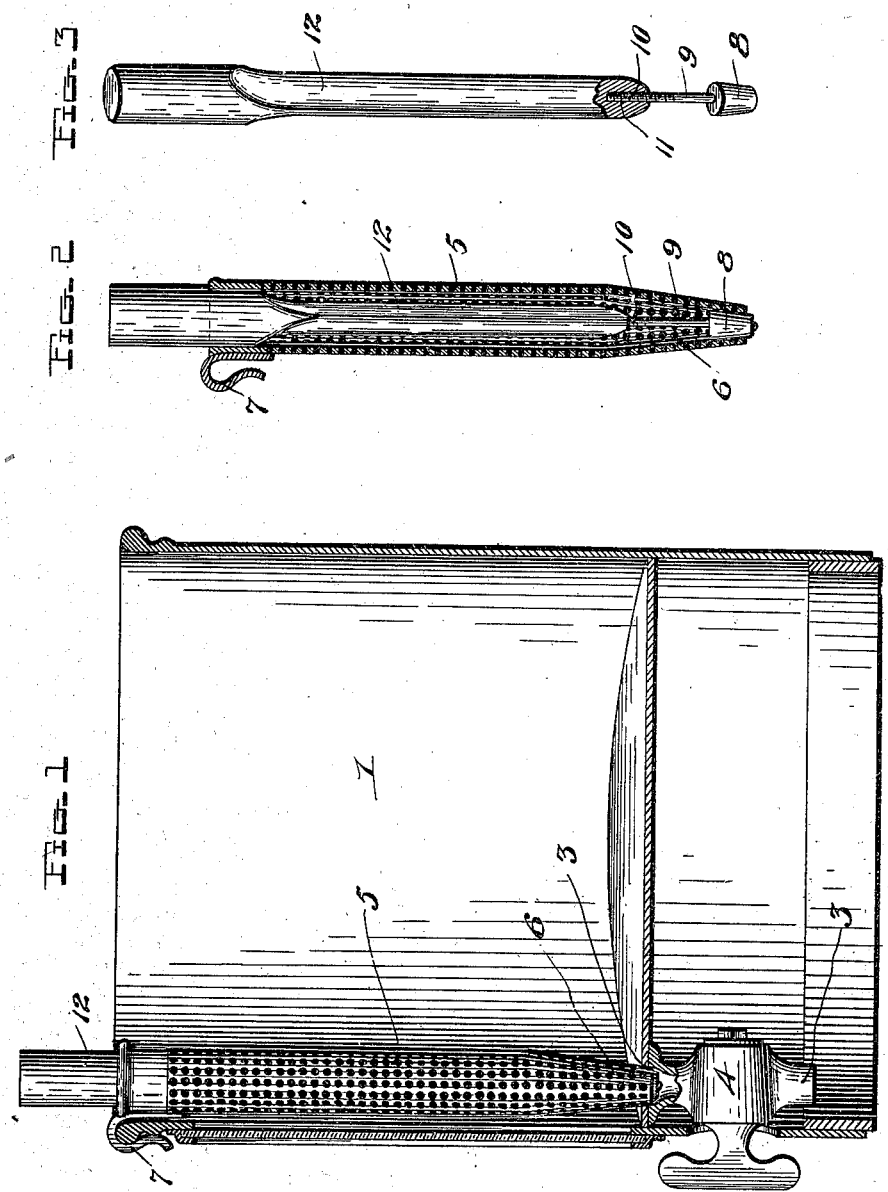

LEWIS T. HANKINS, OF TROY, OHIO, ASSIGNOR OF ONE-HALF TO HENRY M. CASE, OF TOLEDO, OHIO.

COMBINED CURD-KNIFE AND WHEY-STRAINER.

SPECIFICATION forming part of Letters Patent No. 709,319, dated September 16, 1902.

Application filed December 16, 1901. Serial No. 86,103. (No model.)

*To all whom it may concern:*

Be it known that I, LEWIS T. HANKINS, a citizen of the United States, residing at Troy, in the county of Miami and State of Ohio, have invented certain new and useful Improvements in a Combined Curd-Knife and Whey-Strainer; and I do declare the following to be a full, clear, and exact description of the invention, such as will enable others skilled in the art to which it appertains to make and use the same.

This invention relates to a combined curd-knife and whey-strainer for use in the manufacture of cheese.

The object of the invention is to provide a combination device of this character so constructed that the knife may be used independently for cutting curd and also as a handle for a stopper, whereby the lower end of the strainer may be closed to prevent said strainer from being choked up by the entrance of soft curd thereto when the strainer is inserted in the discharge-outlet of a cheese-vat or other suitable vessel.

With this and other objects in view the invention consists of certain novel features of construction, combination, and arrangement of parts, as will be hereinafter more fully described, and particularly pointed out in the appended claims.

In the accompanying drawings, Figure 1 is a vertical section through a curd-receptacle, showing the application of the invention thereto. Fig. 2 is a longitudinal section through the strainer, showing the stopper and curd-knife applied thereto; and Fig. 3 is a detail view of the curd-knife and stopper, the knife appearing partly in section to show the connection of the stopper therewith.

Referring now more particularly to the drawings, the numeral 1 represents a vessel of any desired type suitable for the reception of the curd in making cheese, the said vessel being provided with a discharge port or passage 3, controlled by a draw-off faucet or valve 4 of any ordinary or preferred construction. In the present instance the vessel shown is a dilution creaming-can or cream-separator of well-known construction, which when my invention is employed in connection therewith is made adaptable for use as a cheese-vat.

5 denotes a strainer consisting of a perforated tube having a lower conical end 6 to fit down into the upper portion of the port or passage 3 and provided with a spring-clasp 7 at its upper end to engage the upper edge of the wall of the vessel 1 to support the strainer firmly in vertical position. Adapted to coöperate with the strainer is a plug or stopper 8, which is designed to close the conical end 6 of the strainer and is carried by a stem 9, having a screw-threaded end 10 to engage a screw-threaded orifice 11 in the end of the blade of a handle 12, which is edged to form a curd-knife, this construction adapting the stopper to be applied to and removed from the curd-knife at will.

The mode of operation of the invention is as follows: The curd contained within the vessel 1 is first cut by using the curd-knife 12, and then the stopper 8 is applied to said knife by inserting the threaded end 10 of the stem 9 within the screw-threaded orifice 11 and the two fitted in the strainer-tube 5 in the manner shown in Fig. 2, so that the stopper will close the lower extremity of the conical end 6 of said tube. When this has been done, the strainer is applied to the vessel in the manner shown in Fig. 1, with the conical end 6 thereof fitting into the port or passage 3, the stopper 8 preventing the entrance of the soft curd into the tube when the latter is inserted, and consequently the waste of any of the cheese-making material. The stopper is next withdrawn by pulling out the knife, so as to open the lower end of the strainer-tube, and the faucet 4 is opened to allow the whey to discharge, the solid curd being prevented from passing out by the strainer-tube.

It will thus be seen that the invention provides a combination device which is simple of construction, inexpensive of production, and effects a saving of the cheese-making elements, as the strainer-tube prevents the escape of the butter-globules, which are ordinarily lost by adhering to the cloth strainers commonly used; furthermore, that it also provides a device whereby creaming-cans of ordinary construction may be made to serve the purpose of a cheese-vat, thereby reducing the cost in obtaining the necessary utensils to those engaged in producing cream and cheese.

While the preferred embodiment of the invention is as herein disclosed, it will of course be understood that changes in the form, proportion, and minor details of construction may be made within the scope of the invention without departing from the spirit or sacrificing any of the advantages thereof.

Having thus described my invention, what I claim as new, and desire to secure by Letters Patent, is—

1. A combination cheese-making implement comprising a strainer-tube, a stopper for closing the lower end of said tube, and a handle for the stopper to which said stopper is detachably secured, whereby the handle may be released from the stopper and utilized for a different purpose, substantially as described.

2. A combination cheese-making implement comprising a strainer-tube, a stopper for closing the lower end of said tube, and a handle for the stopper to which said stopper is detachably secured, said handle being formed with an edge to serve as a whey-knife, whereby the handle may be released from the stopper and utilized for a different purpose, substantially as described.

3. The combination, with a cheese vat or vessel provided with a port in its bottom for the discharge of the whey; of a strainer-tube having its lower end formed to fit within said port and provided at its upper end with a clasp to engage the upper edge of the wall of the vessel and support the tube in position, a stopper for closing the lower end of said tube, and a handle to which the stopper is detachably connected, substantially as described.

In testimony whereof I have hereunto set my hand in presence of two subscribing witnesses.

LEWIS T. HANKINS.

Witnesses:
WIRT KESSLER,
J. F. SPITLER.